United States Patent Office 3,420,313
Patented Jan. 7, 1969

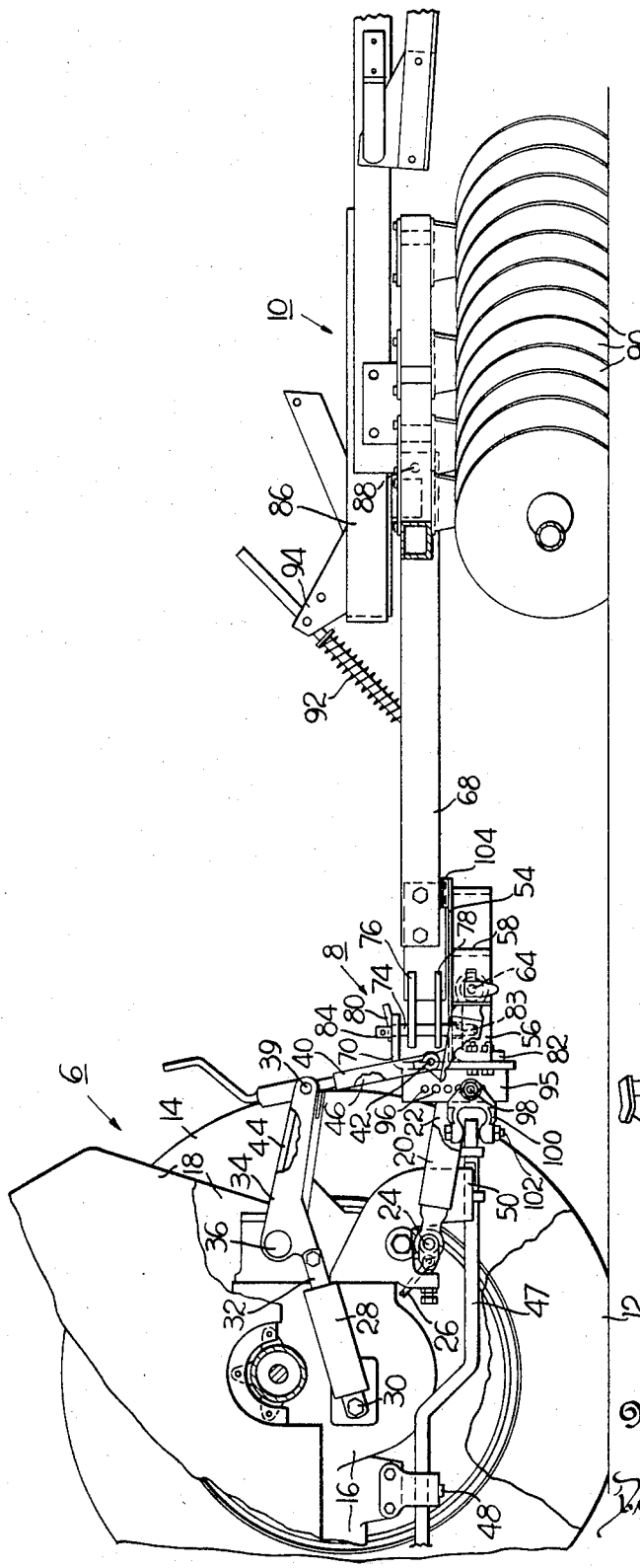
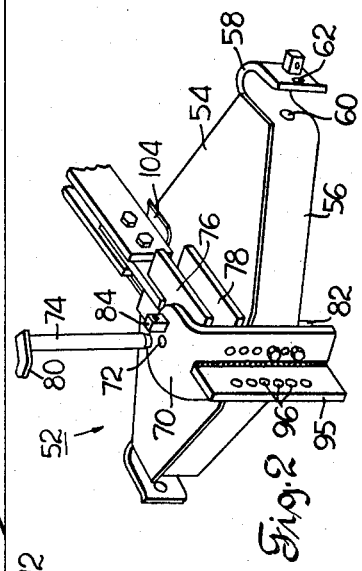

3,420,313
IMPLEMENT HITCH
Maynard E. Walberg, Waukesha, and Richard G. Moe, New Berlin, Wis., assignors to Allis-Chalmers Manufacturing Company, Milwaukee, Wis.
Filed Aug. 29, 1966, Ser. No. 575,760
U.S. Cl. 172—7          9 Claims
Int. Cl. A01b 63/112

This invention relates to tractors and more particularly to the means for connecting the tractor to a drawn implement and especially to such means which facilitates transferring some of the weight of the implement to the rear of the tractor to facilitate the traction effort thereof. An object of the invention is to generally improve hitches or connection means of this sort.

Conventional tractors, as is well known, depend for their pulling power on the frictional contact of two large rear traction wheels with the ground, and it is essential that substantial weight be imposed on these traction wheels in order that the frictional contact will give satisfactory pulling characterstics. When the tractor begins to pull, the weight of the same which has been distributed in a suitable manner between the front and rear wheels is in effect partially transferred to the rear wheels so that a larger and larger proportion of the entire weight appears as weight on the rear wheels as the pull increases. In extreme cases the transfer is complete so that the front wheels of the tractor tend to leave the ground. This is, of course, undesirable and is usually taken care of in the design of the tractor so that it will not occur.

The present invention uses the pressure relief valve for the tractor hydraulic system to limit the amount of weight transfer. In the present instance this relief valve is rated at approximately 2100 pounds per square inch. However, applying this lifting effort to an implement hitch could cause damage so instead of solving this problem by providing a second relief valve of lesser capacity, this invention invisions the provision of a linkage having a mechanical leverage arrangement so that only one-half of this lifting effort of the hydraulic system is applied to the implement hitch.

Accordingly, an object of this invention is to provide an improved universal hitch for all pull type implements utilizing a conventional clevis hitch connection.

A further object of this invention is to provde an improved universal hitch which can be used with a tractor having a weight transfer mechanism and wherein such weight transfer is limited hydraulically to the tractor relief valve setting and with the hitch linkage mechanically apportioning the load to prevent damage to the hitch structure.

A further object of this invention is to provide a universal hitch which can be utilized with a tractor having a weight transfer mechanism and wherein such hitch engages an implement tongue from underneath thereby simplifying turning or pivoting of the implement relative to the tractor.

Further objects and advantages will become apparent from the following specification and annexed drawings in which:

FIG. 1 is a left side elevation partly in vertical section section of so much of a tractor and a connection implement as necessary for an understanding of the invention, with parts broken away to show what lies beneath;

FIG. 2 is an enlarged perspective view of a hitch bar or bridging means indicated in FIG. 1.

As seen in the drawing, the tractor is designated as a whole by numeral 6 and is connected by a hitch means generally designated as 8 with an implement generally designated as 10, in the present instance a disk harrow.

Tractor 6 is carried on traction wheels 12 and 14 connected by a combined transmission and axle housing 16, the traction wheels being guarded by fenders as 18. It will be understood that tractor 6 has numerous parts which are conventional and well known and which do not need to be shown or described as they form no part of the present invention. The tractor is, however, of a somewhat special type having rearwardly extending draft arms 20 and 22, which are spaced laterally from each other for a substantial part of the width of the tractor. Draft arms 20 and 22 are secured to tractor 6 by means of a pivot structure 24 which is of well known type and sensitive to the amount of pull or draft reaction set up in draft arms 20 and 22, and which controls or initiates a flow of pressure fluid as a result of movement of rod 26 and which pressure fluid flows to one or more pressure fluid motors as 28 anchored at 30 to the tractor structure. Motor 28 has a piston rod 32 pivotally connected to a bell crank 34 on a fulcrum in the form of a rockshaft 36, arm 34 being connected by a pivot 38 with an adjustable strut 40 which leads generally downwardly and is connected by means of a pivot 42 with above mentioned draft arm 20. A similar bell crank arm 44 is fixed on rockshaft 36 and is connected by a similar downwardly extending strut 46 with draft arm 22. Extending of piston rod 32 will pivot shaft 36, raise arms 34 and 44 and through struts 40 and 46, also raise draft arms 20 and 22.

In the conventional use of tractor 6, an implement such as a plow would be fastened to the rear ends of draft arms 20 and 22 in any suitable manner and would have an upwardly extending structure connected by a link (not shown since it is not used in connection with the present invention) in the region of rockshaft 36 to the tractor so as to give stability to the implement. The implement would exert a strong backward or draft reaction against arms 20 and 22, which would tend to actuate pivot mechanism 24. Obviously the deeper the implement or plow runs in the ground, the greater this draft reaction. The plow is commonly proportioned to work itself downwardly into the ground so far as to result in a draft reaction beyond the pulling power of the tractor. However, the yielding of pivot 24 when the reaction becomes normal or threatens to become excessive actuates motor 28 and tends to lift the plow as hereinbefore described. The tendency to lift has an equal and opposite downward reaction on tractor 6 and accordingly increases the pressure of the traction wheels 12 and 14 so that the tractor can overcome the draft reaction and pull the plow with minimum slippage of the traction wheels.

In practice the several forces strike a balance with the plow at a depth which will result in a draft reaction which the tractor can overcome, and the downward reaction against the lifting means adding to the capacity of the tractor without adding the dead weight of wheel weights and the like.

Tractor 6 also has a somewhat conventional drawbar 47 which is pivoted at 48 to a portion of housing 16, extends generally rearwardly and is stabilized against up-and-down movement by a conventional quadrant arrangement 50. The usual tongue of a drawn implement may be connected to drawbar 47, and the implement will be pulled along by motion of the tractor. However, drawbar 47 has no connection with pivot structure 24, and draft reaction in drawbar 47 will therefore have no effect on fluid motor 28. Furthermore, draft reaction in drawbar 47 will have no substantial downward pressure effect on the tractor can overcome, and the downward reaction implement from draftbars 20 and 22 in which case the lifting mechanism could be brought into action.

Such a purpose is served by a bridging means particularly shown in FIG. 2 and designated as a whole by numeral 52. It comprises an upper platelike element 54 which extends laterally across the space between draft arms 20 and 22 and has a downwardly directed reinforcing flange portion 56. Flange portion 56 has a return bend at 58 to form a recess for reception of the rear end of draftbar 20 and is provided with holes 60 and 62 for reception of a pin 64 which secures draftbar 20 pivotally to one of the lateral ends of bridging means 52. A similar return bend 66 is positioned at the other end of bridging means 52 to receive the rear end of draftbar 22. Bridging means 52, therefore, extends across the space between draft arms 20 and 22 and furnishes an attaching point for the tongue 68 of implement 10.

Securing means for tongue 68 is provided in the form of an upwardly directed plate 70 which is adjustably fixed to flange 56 at the forward edge of plate 54 and which extends upwardly and bends rearwardly above the forward extremity of drawbar 68 forming with plate 54 a suitable clevis for reception of the drawbar. Plate 70 has a hole 72 in which a draftpin 74 may be inserted and which will extend through any suitable apertured portion of an implement tongue as for example plates 76 and 78. It is to be noted that this hitch is adjustable to accommodate all types of implements having hitch points and clevises of varying heights.

Plate 54 has a hole (not shown) matching or in alignment with hole 72 for reception of draftpin 74.

Draftpin 74 has an offset head portion 80 which, when the pin is in place, extends beyond the margin of plate 70 so that it may be engaged by an instrument to remove pin 74 forceably against any resistance which may develop to such movement.

A reinforcing bracket 82 is attached as by welding to reinforcing flange 56 and to plate 54. Plate 70 is adjustably attached to bracket 82 by conventional means, such as nuts and bolts. The upper portion of bracket 82 is bent over and underlies plate 54 and is provided with an aperture 83 for receiving the lower end of pin 74.

Adjacent hole 72 an apertured lug 84 is fixed on plate 70 and may receive a locking pin of any well known type not shown to extend above head 80 and prevent inadvertent removal of pin 74.

An exactly similar construction is used in the case of pin 64.

It is to be noted that in the present instance, hole 72 is disposed forwardly of holes 60 and 62 and their counterpart at the opposite end of bridging means 52.

Referring more particularly to implement 10 (FIG. 1) a main frame 86 is pivotally connected to tongue 68 for movement about a transversely extending pivot pin 88. Frame 86 carries a pair of longitudinally spaced gang assemblies (only one of which is shown) with each gang assembly including a plurality of earth working discs 90. An adjustable compression spring 92 is engaged between suitable portions of tongue 68 and a bracket 94 extending forwardly from frame 86 to exert a yielding and continuous downward pressure on tongue 68. Tongue 68 therefore presses downwardly on bridging means 52 and this downward pressure is applied through bridging means 52 to the tractor through draft arms 20 and 22 and through struts 40, 46 and their connected mechanism.

An upwardly directed plate 95 is fixed to bridging member 52, in the present instance to above mentioned plate 70. Plate 95 is provided with a series of holes 96 for receiving a bolt 98 which connects a clevis 100 thereto at heights determined by the conditions to be encountered. Clevis 100 is forwardly open and engaged with the rear end of drawbar 47 by means of a bolt 102. Bolt 102 extends through oversized or elongated openings in clevis 100 so that the draft reaction exerted on bridging means 52 will not be exterted on drawbar 47 but will be imposed on draftbars 20 and 22, which will be allowed to move the small amount necessary to actuate pivot arrangement 24. Bolt 102 is substantially forwardly located from pin 64, while plate 54 extends substantially rearwardly of pin 64.

Also, tongue 68 has a wear plate 104 which rests upon the rear margin or region of plate 54. As is common, pin 74 has appreciable freedom in plates 76 and 78 so that significant tilting of pin 74 may take place without binding. It will now be apparent that the forward end of bridging means 52 is prevented from moving up-and-down by drawbar 47. Up-and-down movement of draftbars 20 and 22, therefore, causes up-and-down swinging of bridging means 52 about bolt 102 as a fulcrum. As a result, the rear portion of bridging means 52 in the region of wear plate 104 will move upwardly a distance sufficient to contact the underside of tongue 68.

The operation of the present invention is as follows: As the tractor moves forward and pulls on bridging means 52 through draft arms 20 and 22, this pull on draft arms 20 and 22 is transmitted to pivot structure 24 which actuates rams 28 to exert a raising action on arms 20, 22 through bell cranks 34, 44 and struts 40, 46. Such raising action causes bridging means 52 to move into contact with the lower surface of wear plate 104 and exert a lifting force thereon.

It should be noted that the points of connection between bridging means 52 and arms 20, 22 is at a point about midway between pin 102 and wear plate 104. Accordingly the lifting force exerted through arms 20, 22 is substantially divided and when sufficient force is exerted so that the relief valve (not shown) in the tractor hydraulic system is actuated, only approximately one-half of that force will be applied against wear plate 104 and this maximum force applied against plate 104 is not of an amount to do any damage to the hitch structure. Preferably the working range will be less than the maximum force. In other words, the hydraulic lifting pressure is divided with approximately one-half of the pressure being utilized at pin 102 in an effort which can be likened to trying to lift yourself by your own bootstraps and the other half of the force being utilized at wear plate 104.

It should also be noted that the connection about pin 102 is of a loose nature permitting fore-and-aft movement of clevis 100 while limiting vertical movement of clevis 100.

It is contemplated that others working in this field may devise variations of the structure disclosed, and all such variations are to be considered as part of the invention insofar as they are covered by the claims.

The embodiments of the invention in which an exclusive property or privilege is claimed are defined as follows:

1. The combination with a tractor of the type having a pair of laterally spaced rearwardly directed draft arms and lifting means for the arms responsive to the amount of draft reaction in the arms, of means bridging the space between said arms and supported thereon and having securing means between said arms for an implement tongue, said arms being connected to said bridging means intermediate the fore-and-aft ends thereof and wherein said aft end underlies said implement tongue and being positionable in supporting relation thereto and the fore end of said bridging means being pivotally connected to said tractor.

2. A construction having all the characteristics of claim 1 in which the means responsive to the amount of draft reaction acts to raise the arms by reason of an increase in such draft reaction.

3. A construction having all the characteristics of claim 2 in which the means bridging the space between the arms is of substantial fore-and-aft extent, so as to have a portion positioned beneath an implement tongue to engage the same rearwardly of said securing means.

4. A construction having all the characteristics of claim 3, including means for stabilizing said bridging means so as to exert upward pressure on an implement tongue rearwardly of said securing means by reason of raising of said draft arms, and a downward reaction on said tractor rearwardly of said draft arms.

5. A construction having all the characteristics of claim 4 in which the tractor has a rearwardly directed drawbar, and in which the stabilizing means comprises a connection to said drawbar.

6. A construction having all the characteristics of claim 5 in which said drawbar is fixed at a predetermined level on said tractor, and the connection thereof to said bridging means is spaced axially from the point of support of said bridging means on said arms and of a character to permit up-and-down movement between said drawbar and said bridging means.

7. A construction having all the characteristics of claim 6 in which the connection of said drawbar to said bridging means is spaced forwardly from the point of support of said bridging means on said draft arms.

8. A construction having all the characteristics of claim 7 in which the tongue securing means is spaced axially rearwardly of the connection of the drawbar to the bridging means, and forwardly of the point of support of said bridging means on said draft arms..

9. A construction having all the characteristics of claim 7 in which said tongue is supported on said bridging means at a point rearwardly of the point of support of the bridging means on said draft arms.

References Cited

UNITED STATES PATENTS

| | | | |
|---|---|---|---|
| 2,663,239 | 12/1953 | Rapp et al. | 172—10 |
| 3,204,984 | 9/1965 | Walberg | 172—7 X |
| 3,275,085 | 9/1966 | Bunting et al. | 172—10 |

FOREIGN PATENTS

| | | |
|---|---|---|
| 964,701 | 8/1950 | France. |

ABRAHAM G. STONE, *Primary Examiner.*

J. R. OAKS, *Assistant Examiner.*

U.S. Cl. X.R.

280—405